United States Patent
Stoddart

[19]

[11] Patent Number: 5,972,261
[45] Date of Patent: Oct. 26, 1999

[54] METHOD OF MAKING A CONTAINER FOR ELECTROWINNING CELL

[75] Inventor: Frederick Maxwell Stoddart, Brisbane, Australia

[73] Assignee: Stoddart Bros. Fibreglass Pty Ltd, Birkdale, Australia

[21] Appl. No.: 08/842,224

[22] Filed: Apr. 24, 1997

[51] Int. Cl.[6] ............................ B28B 1/087; B29C 69/02; B29C 70/54
[52] U.S. Cl. .............................. 264/71; 264/128; 264/255
[58] Field of Search ................................ 264/69, 71, 72, 264/113, 128, 162, 255, 257

[56] References Cited

U.S. PATENT DOCUMENTS

| | | | |
|---|---|---|---|
| 3,482,007 | 12/1969 | Routh | 264/71 |
| 3,585,094 | 6/1971 | Ruggles | 264/71 |
| 4,621,010 | 11/1986 | Wadsworth | 428/220 |
| 5,037,520 | 8/1991 | Harry et al. | 204/279 |
| 5,650,104 | 7/1997 | Ibar | 264/72 |

*Primary Examiner*—Angela Ortiz
*Attorney, Agent, or Firm*—Young & Thompson

[57] ABSTRACT

A method for making a container for an electrowinning cell where the first step 10 provides a mold plug 11 and woven glass rovings 12 are applied in the second step shown at 13. Vinylester resin is applied to the glass rovings at 14 to a thickness of about 4 mm. The liner shown at 14 is 97% vinylester resin. The liner is then allowed partially to harden. The liner 15 is then completely removed from the mold plug and then placed on a slightly smaller support 16 which forms the inner portion of a mold having its walls built up around the support 16 with the liner 15 in place as shown at 17. The mold is supported on springs and a vibrator 18 is employed to vibrate the mold as the outer supporting layer is being poured. Four separate pours 19, 20, 21 and 22 are employed. Each pour has progressively less resin. Pour 19 comprises 12% resin, 0.5% glass, 30% fine and coarse river sand and 57.5% gravel mix. Pour 20 comprises 11% resin. 0.5% glass, 30% fine and coarse river sand and 58.5% gravel mix. Pour 21 comprises 10% resin, 0.5% glass, 30% fine and coarse river sand and 59.5% gravel mix. Pour 22 comprises 9% resin, 0.5% glass, 30% fine and coarse river sand and 60.5% gravel mix.

8 Claims, 3 Drawing Sheets

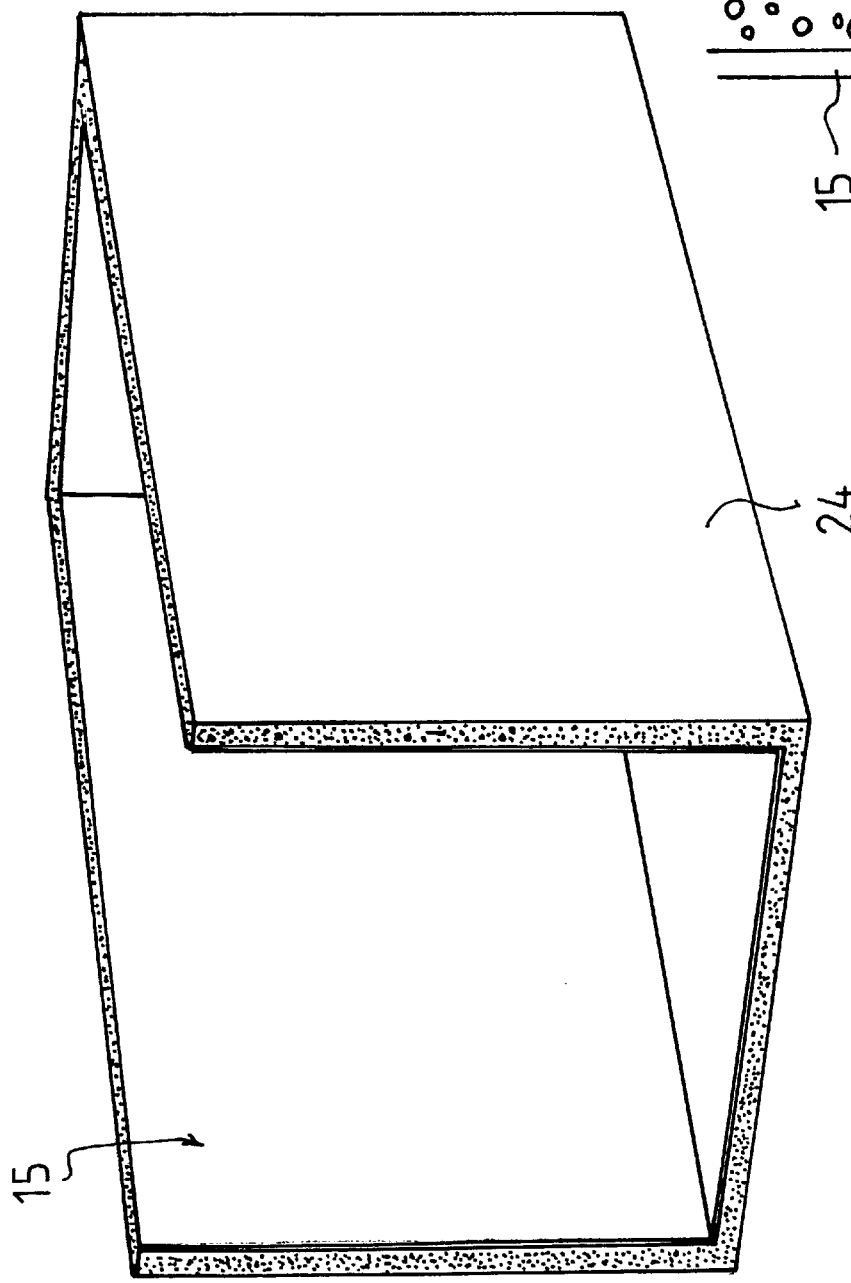
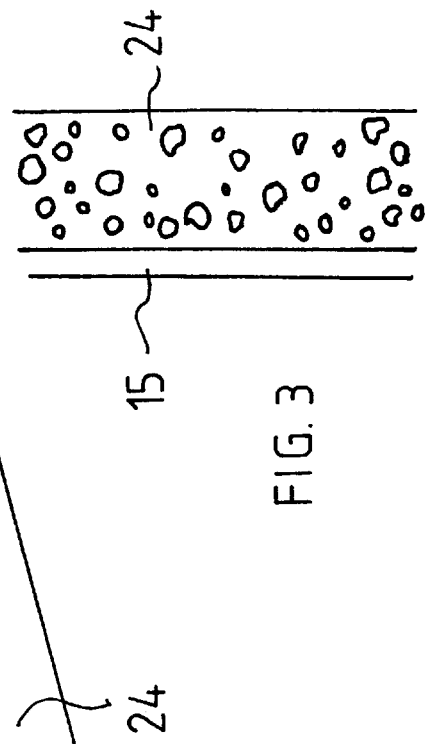
FIG. 2
FIG. 3

METHOD OF MAKING A CONTAINER FOR ELECTROWINNING CELL

BACKGROUND OF THE INVENTION

1. Field of the Invention

This invention relates to a container suited to holding corrosive liquids and in particular to a container made from thermosetting resins. Containers of this type are frequently used in the construction of electrowinning cells used in the mining industry.

2. Description of Prior Art

U.S. Pat. Nos. 4.621,010 and 5,037,520 and Australian patent No. 659,400 describe typical prior art containers. These patents describe containers made using vinylester or polyester resins mixed with sand and gravel.

The container described in U.S. Pat. No. 5,037,520 is molded using a composition employing vinylester or polyester thermosetting resins. The addition of thinning agent, inhibitors, promoters and catalyst modify the resins. The balance of the composition includes dry ingredients of crystalline silica particles token from groups consisting of gloss beads and mica flakes. The resins are mixed with the dry ingredients and then the mixture is continuously poured into an inverted mold. They then allow the mixture to cure at room temperature providing a final container having a smooth inside, bottom side and end wall surfaces. This method results in a container having a wall thickness of about 2.5 inches or 62 mm.

U.S. Pat. No. 4,621,010 describes a laminated container where they employ a mixer designed to limit how much air is drawn into the mixture during the mixing process. Container integrity requires thorough mixing of the ingredients to coat the sand and gravel particles. This introduces air into the mixture promoting porosity in the container wall that can lead to cracks and leakage. It is therefore important to purge as much air as possible from the container wall. Porosity is still a problem despite the precautions taken in this method.

Australian patent No. 659,400 describes a laminated container using vibration to improve adhesion between a vinylester rich liner and a thick outer wall used to give strength and to support the liner. The liner serves the purpose of providing a high integrity non corrosive container while the vibration method reduces of delaminating over time.

Nevertheless all these containers suffer from disadvantages and there is room for improvement, in particular further reductions in air in the container wall is desirable as porosity is a problem that in even small amounts can lead to cracking over time. Another problem arises where the vibration method is in use to improve adhesion between the layers as there is a tendency for the sand in the outer layer to also abrade the wall of the mold in the same way. This makes it difficult to remove the container from the mold increasing labour costs and risking damage to the container or mold.

SUMMARY OF THE INVENTION

It is an object of the present invention to provide a container where air in the mold wall is further reduced when compared with the above prior art.

It is a further object of the present invention to provide a method by which the manufacturer con employ the vibration method and where they easily remove the container from the mold.

In accordance with the invention there is provided a method for molding a laminate container having a thin inner liner and a thick outer supporting layer adhered to the liner, the container being suitable for use in an electrowinning cell, the method comprising:

(i) forming the liner on a supporting plug, the liner comprising a composition of reinforced vinylester resin having a resin richness exceeding 80%;

(ii) allowing the liner partially to harden to a green state sufficient for the liner to release from the plug but not sufficient to inhibit the liner chemically bonding with the outer supporting layer;

(iii) releasing the partially hardened liner from the plug and supporting the partially hardened liner in an inverted position within an outer mold, the outer mold having side walls spaced from the liner providing a space for molding the outer supporting layer;

(iv) forming the outer supporting layer from a mixture of a resin and finely divided abrasive material using a pour comprising separate mixes poured in sequence into the space between the liner and the outer mold with the final mix covering the liner, the mixes of the pour having progressively less resin to promote upward purging of air from the outer supporting layer; and (v) simultaneously vibrating the mold to cause the abrasive material to abrade the liner and by that enhance adhesion between the liner and the outer supporting layer and further assist purging of air from the outer supporting layer.

Preferably the walls of the outer mold are treated with a release agent and then a thin gel coating is applied to the release agent to aid release of the walls of the outer mold from the outer supporting layer.

Typically, the liner is formed with a rim, before the outer supporting layer is poured a conduit is fitted to the liner adjacent the rim, the outer supporting outer layer is poured over the conduit. The conduit is provided a passage means along the top of the electrowinning cell that can be connected to a vacuum for scavenging volatile gases volatile gases arising from the electrowinning process.

The amount of catalyst employed for a typical container usually allows the preparation and pouring of the outer supporting layer within a time period of approximately one hour. For example, in the case of a 3 meter long by 1.4 meter wide by 1.8 meter deep container the ingredients have a dry weight of 3200 kg. The container is poured from 32 mixes comprising a first pour at 8×100 kg mixes at 12% resin, a second pour of 8×100 kg mixes at 11% resin, a third pour of 8×100 kg mixes at 10% resin and a final pour of 8×100 kg mixes at 9% resin.

The use of small mixes of 100 kg enables thorough mixing while reducing air drown into the mix by the mixing process. The mixing process is preferably a folding process to reduce air in the mixture.

The method preferably includes the further step of controlling the exotherm of the outer supporting layer while setting, by application of cooling media to the mold or by controlling the amount of catalyst in the composition.

In one typical application of the present invention, the liner comprises a composition of vinylester resin, continuous fiberglass roving and catalyst applied to a mold plug, the liner being laid to 3 mm to 6 mm thick and being allowed to gel and subsequently being released from the plug and placed on a molding jig surrounded by walls spaced from the liner, the outer supporting layer being poured in to surround the liner and comprising resin, glass fiber, fine and course river sand and gravel folded into an intimate blend and then poured into the mold between the liner and the walls and onto the liner to a thickness of 45 mm to 90 mm while the mold is being vibrated.

Typically, the liner in a most preferred form is made using glass surface tissues to provide a layer having a very fine membrane of glass and a resin richness above 90% with 97% being preferred.

The outer supporting layer typically comprises by weight 10% to 20% resin, 0% to 10% glass, 10% to 20% sand and 30% to 60% gravel with sufficient catalyst to provide about a one hour gel time. Most preferably the exotherm of the outer supporting layer is controlled to eliminate hairline cracks.

The ability to release the mold walls from the outer supporting layer is enhanced by applying a very thin release agent applied to 2.5 to 5 1000th inch followed by a resin gel coat to 20 to 25 1000th inch so that the abrasive media in the outer supporting layer abrades the gel coat rather than the mold walls. Thus the gel coat provides a barrier to a physical bond between the outer supporting layer and the mold walls. A typical release agent that the applicant has found suitable is polyvinyl alcohol while a particularly suitable resin for the gel coat is an isophthalic resin.

In the case of larger containers above 4 meters in length use of additional reinforcement across the container is recommended, typically an extra layer of woven rovings is applied across the bottom of the container and up the long side walls thus alleviating the need to place fiberglass rods inside the walls of the container. Extra reinforcement in the end walls is not of any significant extra benefit.

BRIEF DESCRIPTION OF THE DRAWINGS

In order for the present invention to be more readily understood and be put into practical effect reference will now be made to the accompanying drawings which illustrate preferred embodiments of the present invention and in which:

FIG. 2 is a part cut away view of a container made according to the present invention;

FIG. 3 is a part section through the wall of a container mode according to the teachings of the present invention;

DESCRIPTION OF PREFERRED EMBODIMENTS

Figure 1:
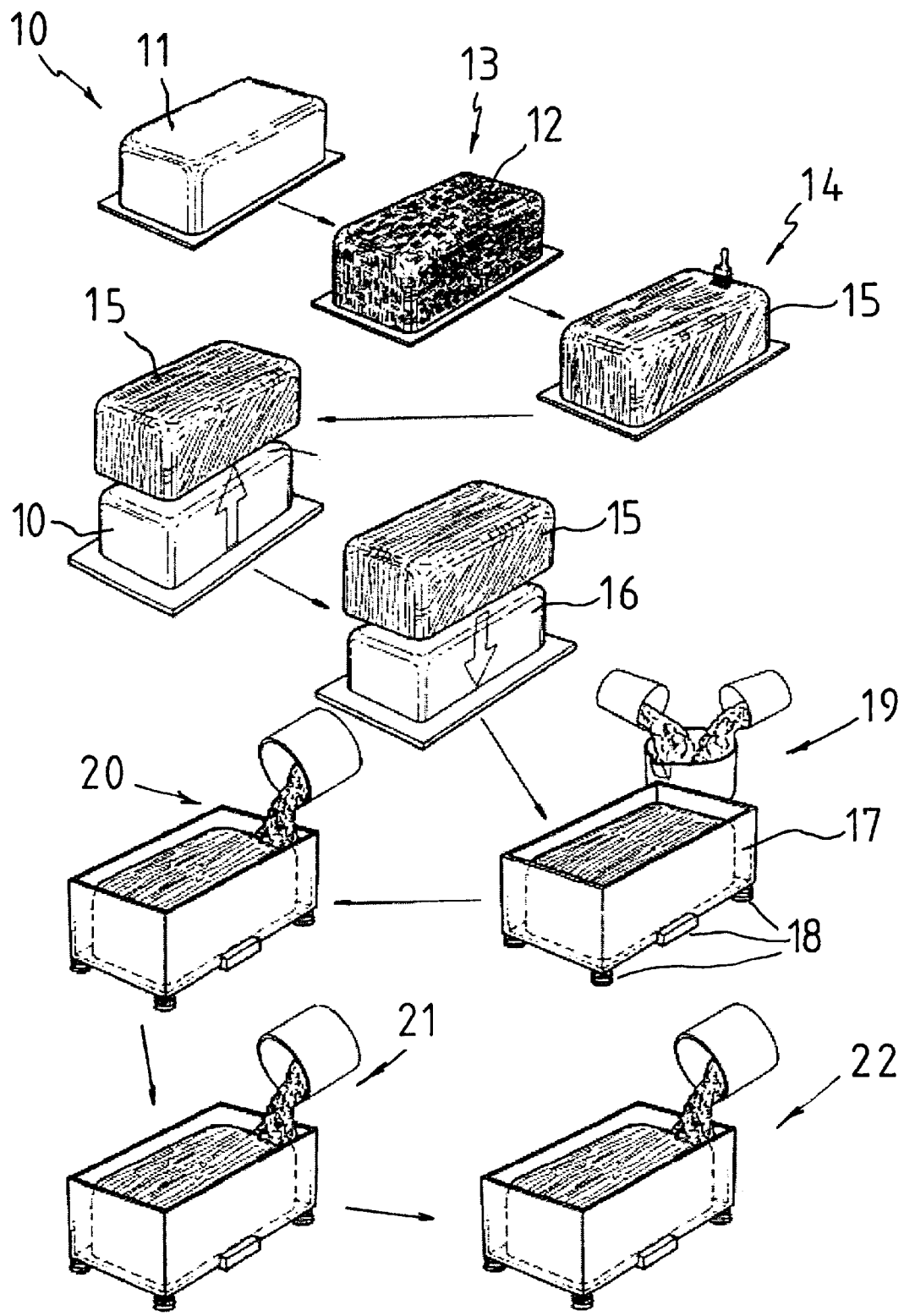
FIG. 1 is a schematic flow diagram showing stages in the method according to the present invention.

Referring to the drawings and initially to FIG. 1 there is illustrated in schematic flow form the method according to the present invention where the first step 10 provides a mold plug 11 and woven glass rovings 12 are applied in the second step shown at 13. Vinylester resin is applied to the gloss ravings at 14 to a thickness of about 4 mm. For larger liners an extra layer of glass woven rovings can be applied across the top as shown and down both sides to add support along the long sides of the liner. Less reinforcement can be employed in the ends of the liner.

The liner shown at 14 is 97% vinylester resin and therefore essentially a filler free vinylester to provide maximum chemical resistance.

The liner is then allowed partially to harden. The liner 15 is then completely removed from the mold plug and then placed on a slightly smaller support 16 which forms the inner portion of a mold having its walls built up around the support 16 with the liner 15 in place as shown at 17. The mold is supported on springs and a vibrator 18 is employed to vibrate the mold as the outer supporting layer is being poured.

As seen in FIG. 1 four separate pours 19, 20, 21 and 22 are employed. Each pour has progressively less resin.

Pour 19 comprises 12% resin, 0.5% glass, 30% fine and coarse river sand and 57.5% gravel mix. Pour 20 comprises 11% resin, 0.5% glass, 30% fine and coarse river sand and 58.5% gravel mix. Pour 21 comprises 10% resin, 0.5% glass, 30% fine and coarse river sand and 59.5% gravel mix. Pour 22 comprises 9% resin, 0.5% glass, 30% fine and coarse river sand and 60.5% gravel mix.

Each pour includes sufficient catalyst for a 50 to 60 minute gel time. This will vary depending on the size and shape of the container.

As the mold is being filled, the mold is continuously vibrated so that the sand and gravel particles in the outer supporting layer act abrasively on the liner to provide physical interlocking between the layers. Also as the liner is only partially hardened, there is a chemical reaction between the two layers which again enhances the adherence between the layers.

To reduce the likelihood of hairline fractures in the outer supporting layer, the exotherm of the process occurring during molding is controlled. In the illustrated embodiment, for a container measuring about 6 meters long by 1.5 high and 1.5 meters wide, a pour time before gelling of the outer supporting layer is set at around 1.5 hours giving enough time to pour the outer supporting layer in about the first hour. The vibration is continued for the full 1.5 hours and may even be carried on longer without adversely effecting the final product.

To assist removal of the mold walls the mold walls are pretreated with a very thin layer of polyvinyl alcohol release agent followed by a thin spray of an isopholic resin so that the supporting layer adheres to the isopholic resin layer rather than the walls of the mold.

Once the mold walls have been removed, the container is of the general form shown in FIGS. 2 and 3. It will be appreciated that the container is made to the end users requirements and typically includes provision for formation of inlets, outlets, overflows, fixing inserts and so forth, all of which are prepared in the mold so that these can be integrally molded. In the case of an electrowinning cell, the mold is typically formed with recesses and slots to receive panels later.

To release the container from the jig and the outer walls, the outer walls are first taken off and then air is applied to lift the container from the jig. The container is removed from the jig and stored in heated conditions for twelve hours.

It will be appreciated that the outer supporting layer is designed to support the chemically resistant liner and can comprise any suitable mixture of compatible resins, glass fibers, glass beads, sands, gravel, timber, sawdust synthetic fibers, plywood, F.R.P. dust, mineral talcs, earth or cement mix.

Figure 4:
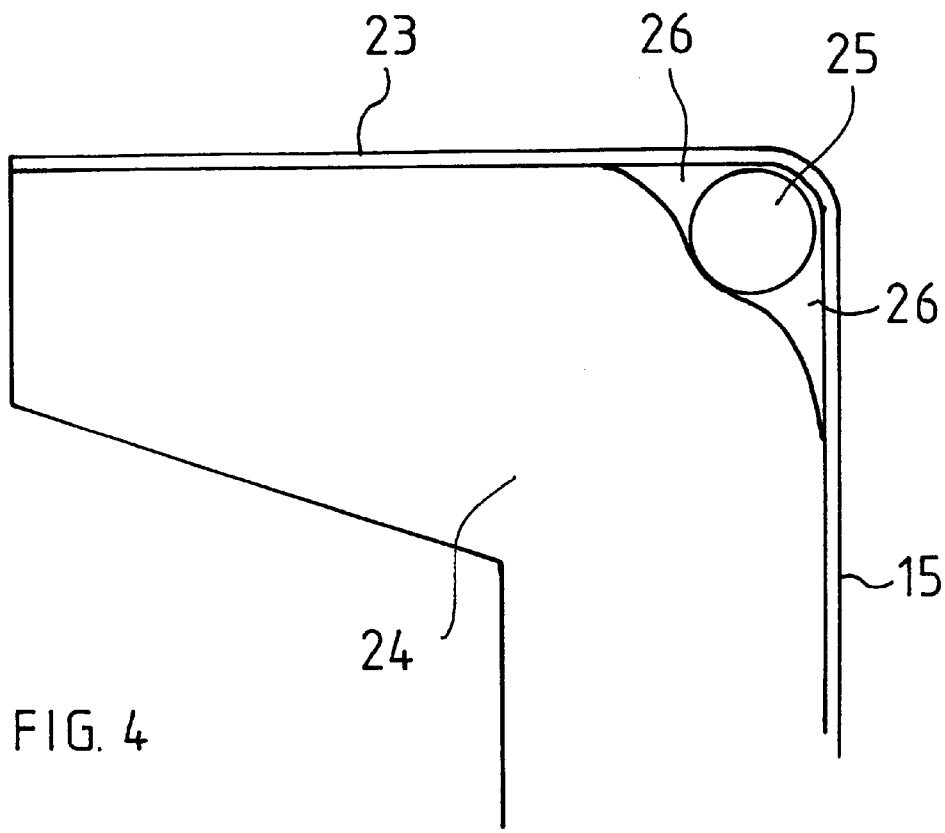
FIG. 4 is a part section through the rim of a container according to the present invention where the container has been equipped with a conduit enabling the container to be used to scavenge volatile gases from the top of an electrowinning cell.
Figure 5:
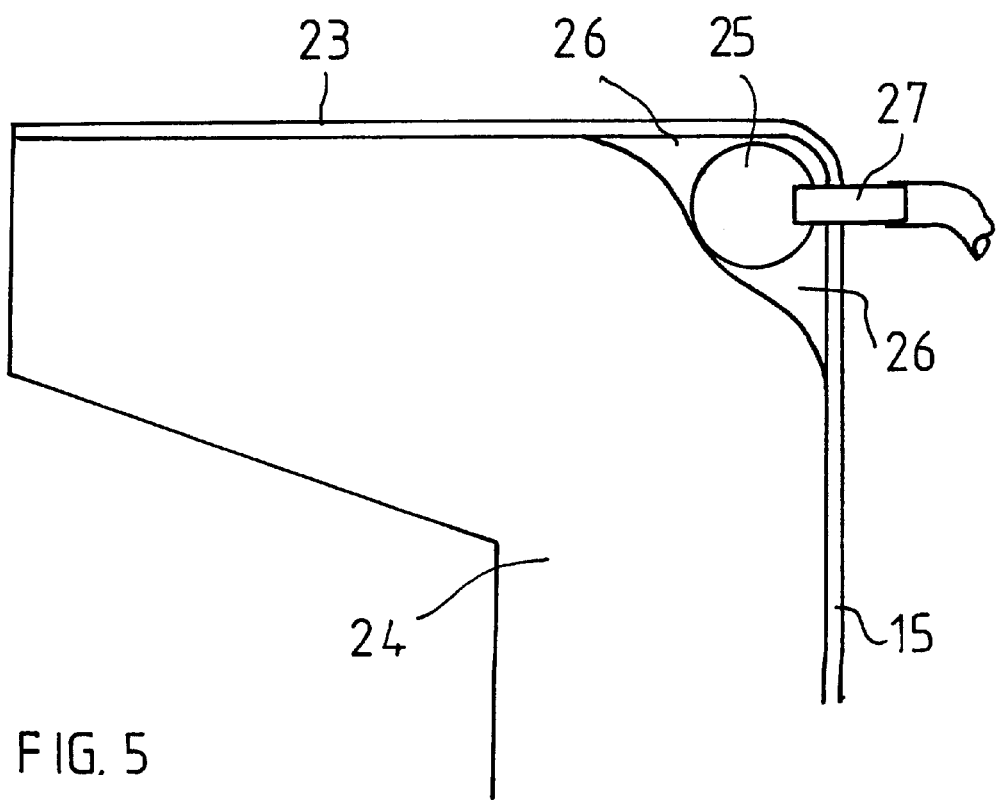
FIG. 5 is a view similar to FIG. 4 but the conduit has been fitted with inlet tubes passing through the liner into the conduit.

FIGS. 4 and 5 illustrate a typical variation suitable for a zinc electrowinning cell where generation of hydrogen can be dangerous and collecting the hydrogen in sacks and use of a vacuum to draw off the hydrogen is usual.

As can be seen in FIG. 4 the liner 15 includes a flange 23 and before the outer supporting layer 24 is poured a conduit 25 is posit flange 23 and retained in place using resin mix at 26 and then the outer supporting layer 24 is poured in the usual way. If when using the container in an environment where gases are present, it being desirable to provide scavenge holes, these can be drilled through the liner into the otherwise concealed conduit and short tubes 27 can be inserted at spaced locations along the conduit. The conduit con then be attached to a vacuum and the tubes to the usual hydrogen collection sacks so that the hydrogen can be drawn off safely.

Whilst the above has been given by way of illustrative example of the present invention many variations and modifications thereto will be apparent to those skilled in the art without departing from the broad ambit and scope of the invention as herein set forth in the appended claims.

I claim:

1. A method for molding a laminate container having a thin inner liner and a thick outer supporting layer adhered to the liner, the container being suitable for use in an electrowinning cell, the method comprising, (i) forming the liner on a supporting plug, the liner comprising a composition of reinforced vinylester resin having a resin richness exceeding 80%;

(ii) allowing the liner partially to harden to a green state sufficient for the liner to release from the plug but not sufficient to inhibit chemically bonding with the outer supporting layer;

(iii) releasing the partially hardened liner from the plug and supporting the partially hardened liner in an inverted position within an outer mold, the outer mold having side walls spaced from the liner providing a space for molding the outer supporting layer;

(iv) forming the outer supporting layer from a mixture of resin and finely divided abrasive material using a pour comprising separate mixes poured in sequence into the space between the liner and the outer mold with the final mix covering the liner, the mixes in the pour having progressively less resin to promote upward purging of air from the outer supporting layer; and (v) simultaneously vibrating the mold to cause the abrasive material to abrade the liner and by that enhance adhesion between the liner and the outer supporting layer and further assist purging of air from the outer supporting layer.

2. The method according to claim 1 wherein the walls of the outer mold are treated with a release agent and then a thin gel coating is applied to the release agent to aid release of the walls of the outer mold from the outer supporting layer.

3. The method according to claim 1 wherein the liner is formed with a rim and before the outer supporting layer is poured a conduit is fitted to the liner adjacent the rim and then the outer supporting layer is poured over the conduit, the conduit providing a passage means along the top of an electrowinning cell for scavenging volatile gases arsing from an electrowinning process.

4. The method according to claim 1 wherein the liner is free of abrasive material and the mixture from which the liner is made comprises at least 80% by weight vinylester resin with the balance being continuous glass roving, C.S.M. and woven roving.

5. The method according to claim 1 wherein the liner comprises a composition of vinylester resin, continuous fiberglass roving and catalyst applied to a mold plug, the liner being 3 mm to 6 mm thick and being allowed to gel and subsequently being released from the plug and placed on a molding jig surrounded by walls spaced from the liner, the outer supporting layer comprising resin, glass fiber, fine and course river sand and gravel folded into an intimate blend and then poured into the mold between the liner and the walls and onto the liner to a thickness of 45 mm to 90 mm while the mold is being vibrated.

6. A method of making a container having an inner liner supported by an outer layer, the method comprising the steps of:

forming the liner on a supporting plug from a material that is more than 80% resin and includes reinforcing fibers;

allowing the liner to partially harden to a green state and releasing the liner from the plug while it is in the partially hardened green state;

supporting the partially hardened liner inverted in a mold having sides spaced from the inverted liner;

filling a space between the inverted liner and mold sides by successively pouring plural abrasive material mixes containing resin into the space, where each of the successively poured mixes comprises less resin than the previously poured mix; and abrading a surface of the liner with the abrasive material in the successively poured mixes by vibrating the mold while filling the space.

7. The method of claim 6, wherein a first of the successively poured mixes contains more than 10% resin and a last of the successively poured mixes contains less than 10% resin.

8. The method of claim 6, wherein the liner is more than 90% resin.

\* \* \* \* \*